US009884209B2

(12) United States Patent
Hwang (10) Patent No.: US 9,884,209 B2
(45) Date of Patent: Feb. 6, 2018

(54) ROPE GRAB

(71) Applicant: CAPITAL SAFETY GROUP (AUSTRALIA) PTY LIMITED, Silverwater, New South Wales (AU)

(72) Inventor: Han Young Hwang, Eastwood (AU)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/038,366

(22) PCT Filed: Nov. 25, 2014

(86) PCT No.: PCT/AU2014/001068
§ 371 (c)(1),
(2) Date: May 20, 2016

(87) PCT Pub. No.: WO2015/074105
PCT Pub. Date: May 28, 2015

(65) Prior Publication Data
US 2016/0287914 A1   Oct. 6, 2016

(30) Foreign Application Priority Data
Nov. 25, 2013   (AU) .............................. 2013904541

(51) Int. Cl.
*A62B 1/14*   (2006.01)
*A62B 35/00*   (2006.01)
*F16D 63/00*   (2006.01)

(52) U.S. Cl.
CPC ............ *A62B 1/14* (2013.01); *A62B 35/0068* (2013.01); *F16D 63/008* (2013.01)

(58) Field of Classification Search
CPC ................................. A62B 1/14; F16D 63/008
See application file for complete search history.

(56) References Cited

U.S. PATENT DOCUMENTS 5,316,103 A   5/1994   Bell et al.
6,155,384 A * 12/2000   Paglioli .................... A62B 1/14
                                                188/65.2

(Continued)

FOREIGN PATENT DOCUMENTS

EP   2246100 A1   11/2010
FR   2638094 A1   4/1990

OTHER PUBLICATIONS

Kong s.p.a. Italy, Work Positioning: Back-Up Fall Arrester, Instruction manual; Retrieved from the Internet <http://www.kong.it/media/Component/CatalogProduct/p398-back-up/attachments/1_KONG_BACK_UP.pdf> published Oct. 2009, as per back cover page of instruction manual. Figures 1-16, 10 pages.

(Continued)

*Primary Examiner* — Bradley King
(74) *Attorney, Agent, or Firm* — Dicke, Billig & Czaja, PLLC (57) ABSTRACT

The present invention relates generally to a rope grab comprising a body, and a cover member pivotally coupled to the body. The rope grab also comprises a cam pivotally coupled to the body for grabbing a rope or other lifeline. The rope is grabbed or engaged within a recess defined by the body. The rope grab is designed to provide fall protection, work positioning, and a moveable and temporary anchor point on the lifeline.

16 Claims, 7 Drawing Sheets

(56) References Cited

U.S. PATENT DOCUMENTS

| | | | |
|---|---|---|---|
| 7,108,099 B2* | 9/2006 | Ador | A62B 1/14 182/192 |
| 8,387,751 B2* | 3/2013 | Miceli | A62B 1/14 182/192 |
| 2012/0005864 A1* | 1/2012 | Chen | A62B 1/14 24/132 WL |
| 2013/0219671 A1* | 8/2013 | Hutin | A62B 1/14 24/134 KB |
| 2014/0020983 A1* | 1/2014 | Casebolt | A62B 1/14 182/241 |
| 2014/0262611 A1* | 9/2014 | Oddou | A62B 1/14 182/5 |
| 2016/0258457 A1* | 9/2016 | Moine | F16B 2/06 |

OTHER PUBLICATIONS

Kong #802 Back-Up, published Mar. 17, 2011, Retrieved from the Internet <http:/www.usrigging.com/pdfs/Kong802Back-Up.pdf>, 1 page.

Camp Safety "Goblin" Fall Arrest Device, Technical Information Sheet, Published Sep. 27, 2012, Retrieved from the Internet <http://www.abaris.co.uk/prod/Fall-Arrest-Devices/camp-goblin-fall-arrester.htm>, 3 pages.

Supplementary European Search Report for EP 14864597 dated Jun. 29, 2017.

* cited by examiner

Fig. 6A Fig. 6B Fig. 6C Fig. 6D

ROPE GRAB

CROSS-REFERENCE TO RELATED APPLICATIONS

This Utility Patent Application is a U.S. National Stage filing under 35 U.S.C. §371 of PCT/AU2014/001068, filed Nov. 25, 2014, incorporated by reference herein.

FIELD OF THE INVENTION

The present invention relates broadly to a rope grab that is typically fitted to travel along rope or other lifelines.

BACKGROUND OF INVENTION

In a conventional rope grab the body is provided in one-piece having a channel defined by a pair of opposing flanges interconnected by an adjoining web. The rope grab includes a cam and lever pivotally connected to the body via a fixed shaft connected to and bridging the pair of opposing flanges. The cam is biased via a flexible wire so that it presses against a rope or other lifeline which passes through the channel of the body. The flexible wire typically protrudes outside the body of the rope grab. In operation a user connects herself/himself or a load to the end of the lever of the rope grab via a coupling arrangement. If the user falls or loads the lever the coupling arrangement forces the cam to clamp the rope within the channel to lock the device onto the rope thereby arresting the user's fall or providing a temporary anchor point on the lifeline. The rope grab is connected to the rope by threading one end of the rope into the channel enclosed by the cam.

In a variation on this conventional rope grab the fixed shaft is designed so that it can be retracted from the body to release the cam and lever to expose the channel. The rope anywhere along its length can then be placed within the channel and the cam and lever returned to the body with reinsertion of the retractable shaft.

SUMMARY OF INVENTION

According to the present invention there is provided a rope grab comprising:
  a body including a recess adapted to receive a rope;
  a cover member coupled to the body for movement between an open position where the recess is exposed for receipt of the rope, and a closed position where the cover member encloses the recess to capture the rope;
  a cam pivotally coupled to the body or the cover member, said cam configured for grabbing the rope within the recess when the rope grab is moved along the rope in one direction only whereas movement in an opposite direction along the rope is permitted without the cam grabbing the rope;
  a lever connected to the cam and coupled to a coupling for securement to a user, the rope grab designed whereby movement of the cover member between the open and closed positions is effected whilst the coupling is connected to the lever.

Preferably the cover member is pivotally coupled to the body via a pivot axle. More preferably the cam is also pivotally coupled to the body via the pivot axle.

Preferably the rope grab also comprises a catch operatively coupled to the body to retain the cover member in the closed position. More preferably the catch is movably coupled to the body and configured on actuation to release the cover member for movement toward the open position.

Preferably the cover member includes a cover plate which is generally flat and arranged to pivot in a plane disposed substantially perpendicular to the pivot axle. More preferably the cover plate includes a key configured on pivoting movement toward the closed position to engage with a keyway of the body.

Alternatively or additionally the cover member includes a retaining member connected to the cover plate and configured on pivoting movement toward the closed position to retain the body. In this alternative embodiment the retaining member includes a flange arranged on pivoting movement of the cover member toward the closed position to engage a rebate in the body.

Preferably the rope grab further comprises a spring operatively coupled to the cam to urge it into gripping engagement with the rope. More preferably the spring is a torsion spring mounted to the pivot axle.

Preferably the cam is connected to a lever adapted to connect to a coupling secured to a user. More preferably the cam is formed integral with the lever.

BRIEF DESCRIPTION OF DRAWINGS

In order to achieve a better understanding of the nature of the present invention a preferred embodiment of a rope grab will now be described, by way of example only, with reference to the accompanying drawings in which.

DETAILED DESCRIPTION

As shown in FIGS. 1A to 1D and 2A to 2D there is a rope grab 10 of a preferred embodiment comprising a body 12, and a cover member 14 pivotally coupled to the body 12. The rope grab 10 also comprises a cam 16 pivotally coupled to the body 12 for grabbing or engaging a rope or other lifeline such as 18. The rope 18 is grabbed within a recess 20 defined by the body 12. The rope grab 10 is generally designed to provide fall protection, work positioning and a moveable and temporary anchor point on the lifeline 18.

The cover member 14 is pivotally coupled to the body 12 via a pivot axle 22. In this example the cam 16 is also pivotally coupled to the body 12 via the pivot axle 22 and the cam 16 is positioned between the body 12 and the cover member 14. The cam 16 extends into the recess 20 defined by the body 12. The rope grab 10 further comprises a torsion spring 24 mounted to the pivot axle 22 and operatively coupled to the cam 16 to urge it into gripping engagement with the rope 18.

The cam 16 of this embodiment is connected to a lever 26 adapted to connect to a coupling secured to a user (not shown). The coupling may typically take the form of a carabiner and lanyard connected to a user's harness (not shown). The lever 26 includes an eye-shaped connection point 28 for attachment to the coupling, such as the carabiner (not shown). The connection point 28 of this embodiment is arranged orthogonal to the general plane of the lever 26. The cam 16 of this example is formed integral with the lever 26 as one-piece.

The cover member 14 is configured to be moved from an open position to a closed position as shown in FIGS. 1A to 1D and 2A to 2D, respectively. In the open position the recess 20 is exposed for receipt of the rope 18. In the closed position the recess 20 is enclosed by the cover member 14 to capture the rope 18.

The rope grab 10 also comprises a catch 30 operatively coupled to the body 12 to retain the cover member 14 in the closed position. The catch 30 of this example includes a retaining button 32 mounted within the body 12 and configured to engage a complementary-shaped opening 34 in the cover member 14. The retaining button 32 is depressed to release the cover member 14 and allow it to pivot about the pivot axle 22 toward the open position.

In this embodiment the cover member 14 includes a cover plate 36 which is generally flat and is arranged to pivot in a plane disposed substantially perpendicular to the pivot axle 22. The cover plate 36 includes a key 38 configured on pivoting movement toward the closed position to engage with a keyway 40 on the body 12. In this example the keyway 40 is defined by a groove 42 in the body 12 and the key 38 is a complementary-shaped tongue 44 at a peripheral edge of the cover plate 36.

In operation the rope grab 10 of this preferred embodiment functions as follows:

1. The cover member 14 is on release of the catch 30 pivoted relative to the body 12 to an open position to expose the recess 20;
2. The rope 18 is placed within the recess 20 anywhere along the rope's 18 length (see FIGS. 1A to 1D);
3. The cover member 14 is pivoted into the closed position wherein it encloses the recess 20 to capture the rope 18 (see FIGS. 2A to 2D).

As shown in FIGS. 3A to 3D and FIGS. 4A to 4C the rope grab 10 may prior to these steps already be connected to its associated coupling in the form of the carabiner 13 and lanyard 15, and user's harness or load. Alternatively the rope grab 10 may be connected to the rope 18 and thereafter be connected to the associated coupling 13/15 or user's harness/load. The rope grab 10 is designed in a conventional manner to grab or otherwise engage the rope 18 once loaded or on rapid descent or fall of a user, see FIGS. 3A and 3B and FIGS. 4A and 4B. The torsion spring 24, without the weight of a user/load, urges the cam 16 into gripping engagement with the rope 18, see FIGS. 3C and 3D and FIG. 4C. During use, the rope grab 10 may move in an upward direction along the length of the rope 18 because, although the cam 16 is biased into gripping engagement with the rope 18, the engagement is not sufficient enough to prevent movement.

Figure 1A:
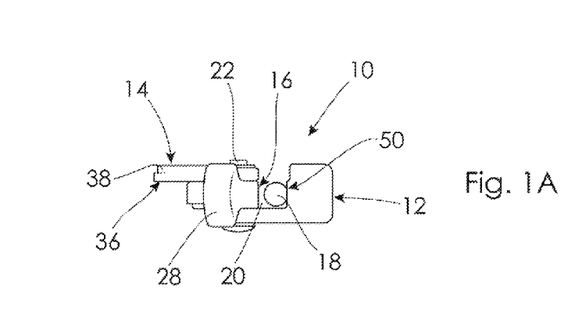
FIGS. 1A to 1D show various elevational, top and perspective views of a rope grab in its open position according to an embodiment of the present invention.
Figure 1B:
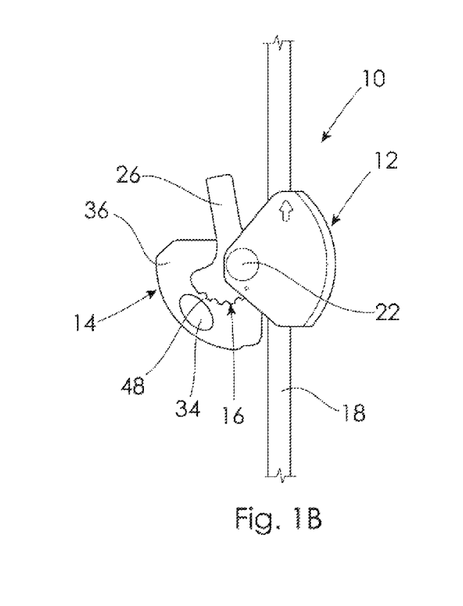
Figure 1C:
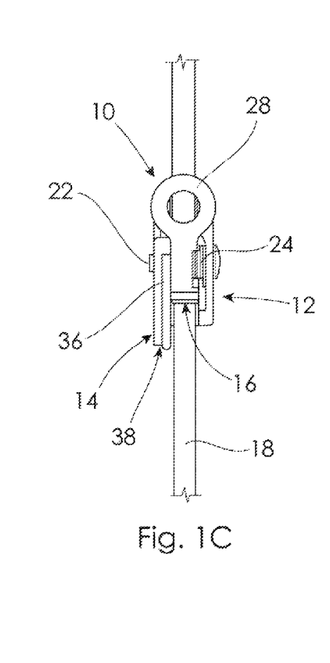
Figure 1D:
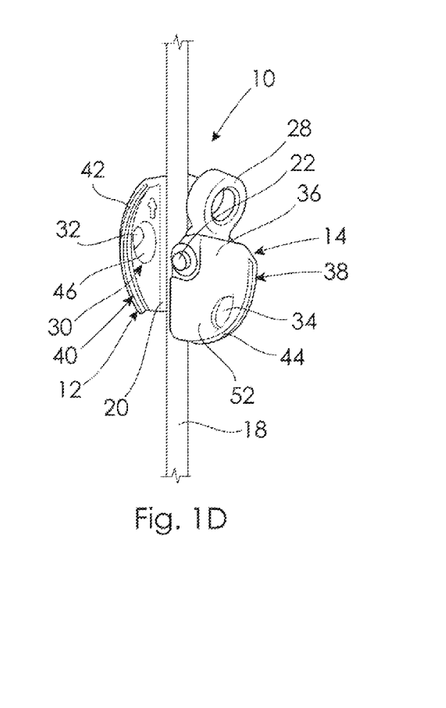
Figure 2A:
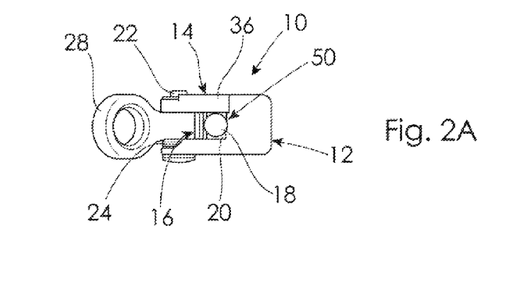
FIGS. 2A to 2D illustrate various views of the rope grab of FIG. 1 but in the closed position.
Figure 2B:
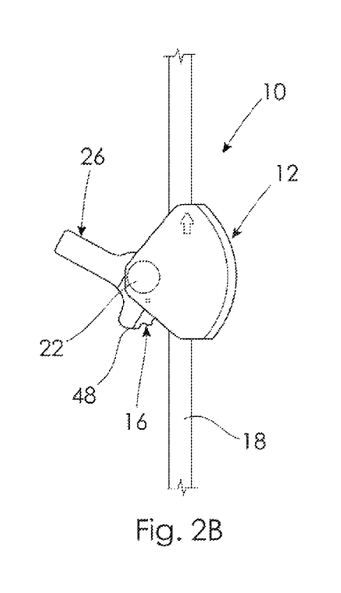
Figure 2C:
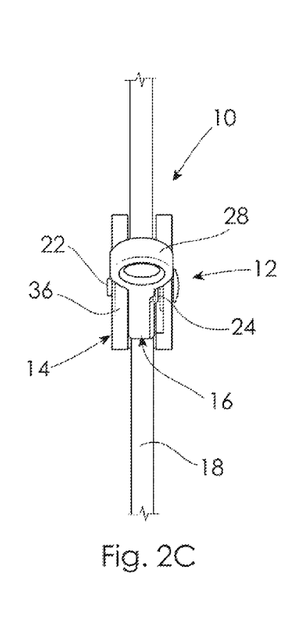
Figure 2D:
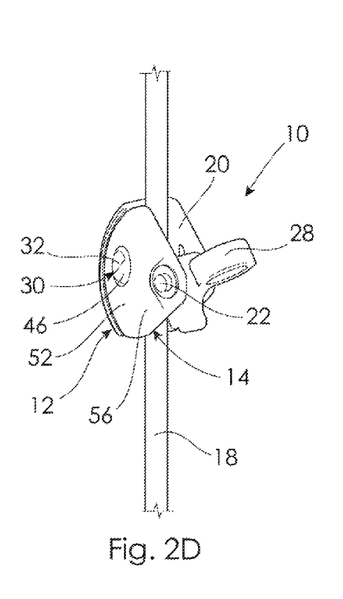
Figure 3A:
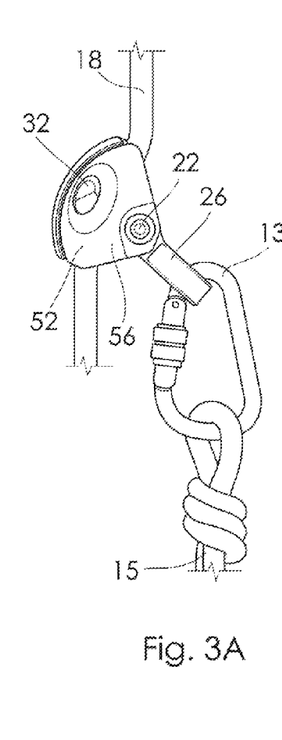
FIGS. 3A to 3D illustrate various views of the rope grab of FIGS. 2A to 2D in operation.
Figure 3B:
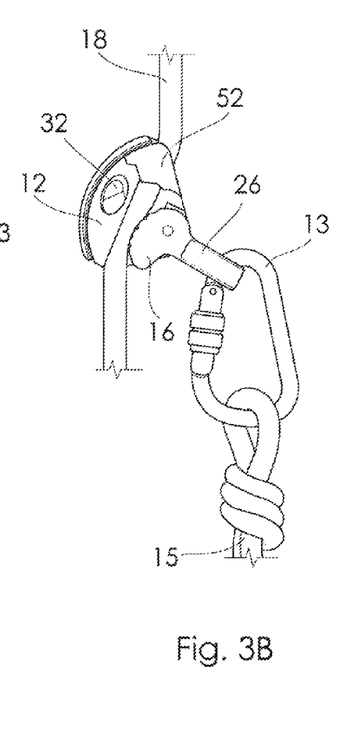
Figure 3C:
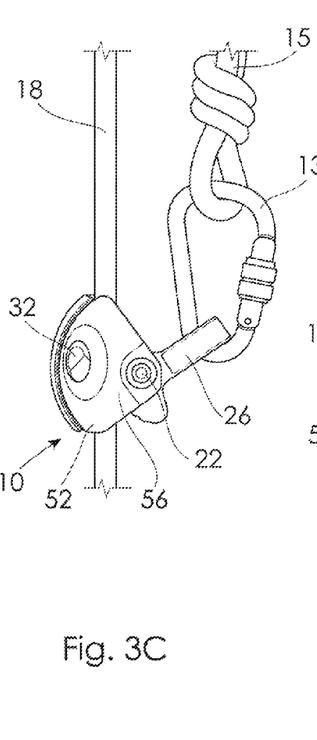
Figure 3D:
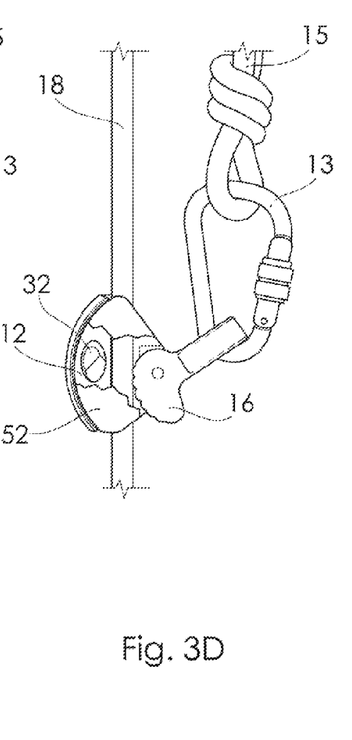
Figure 4A:
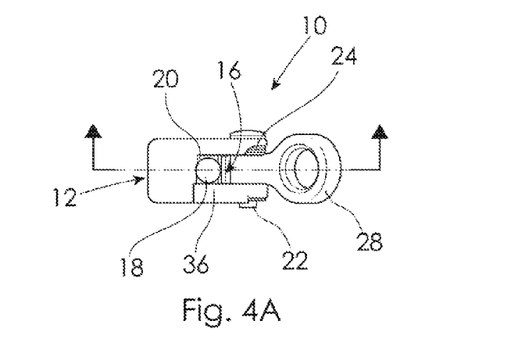
FIGS. 4A to 4C show bottom and sectional views of the rope grab of FIGS. 3A to 3D in operation.
Figures 4B, 4C:
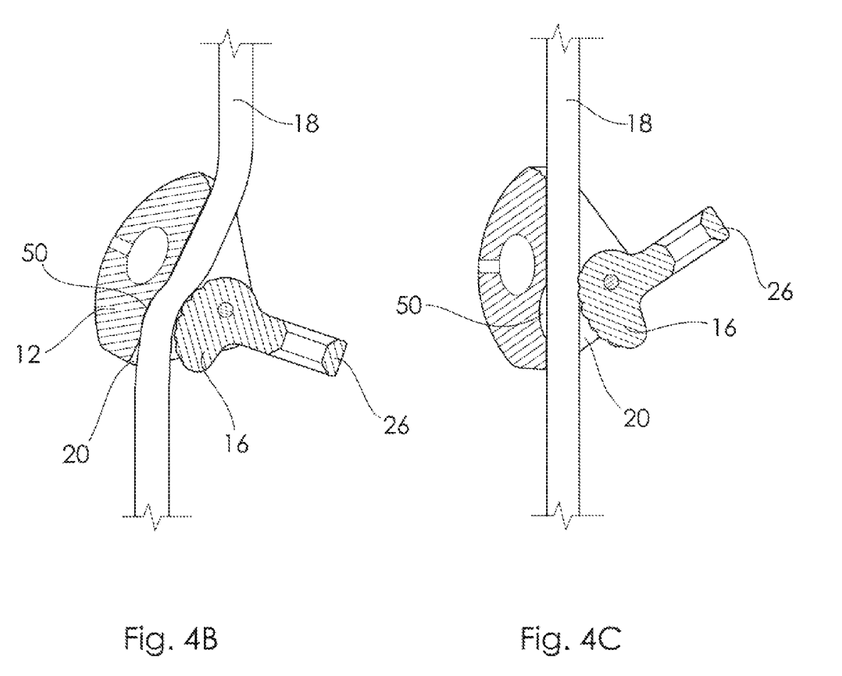
Figure 5A:
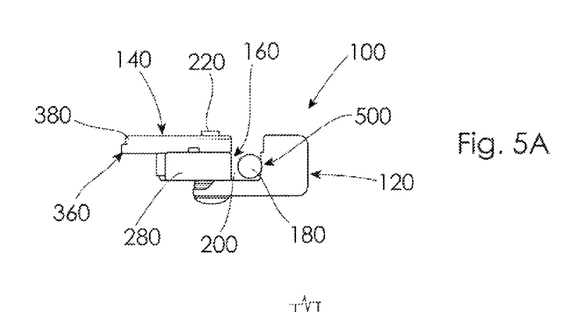
FIGS. 5A to 5D show various elevational, top and perspective views of a rope grab in its open position according to another embodiment of the invention.
Figure 5B:
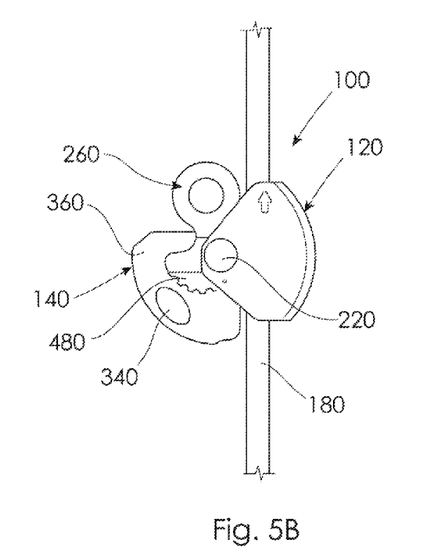
Figure 5C:
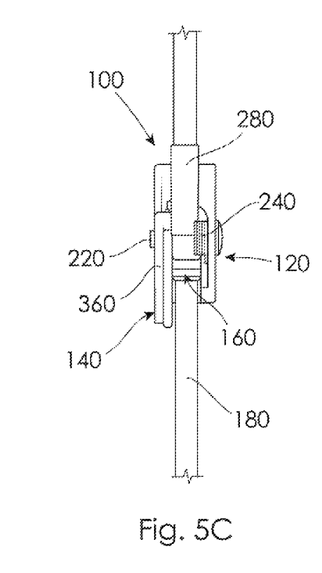
Figure 5D:
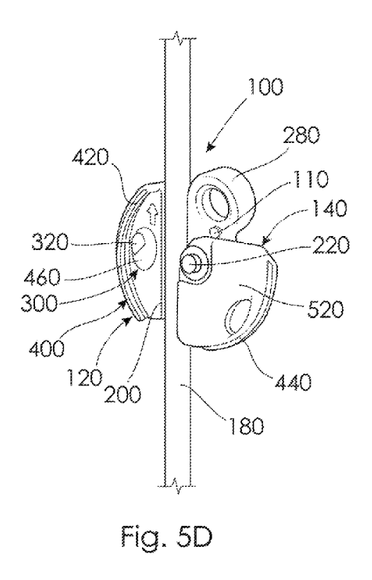
Figure 6A:
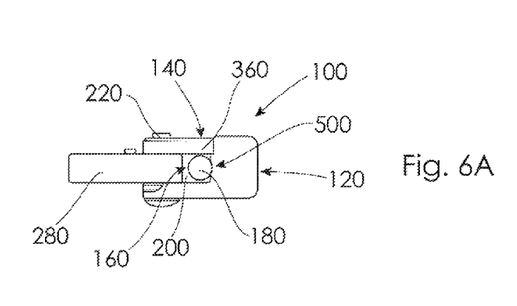
FIGS. 6A to 6D illustrate various views of the rope grab of FIGS. 5A to 5D but in the closed position.
Figure 6B:
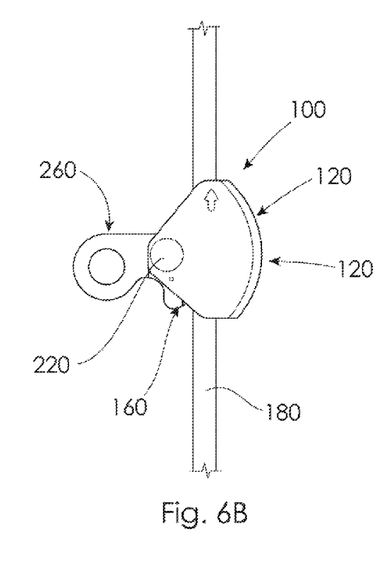
Figure 6C:
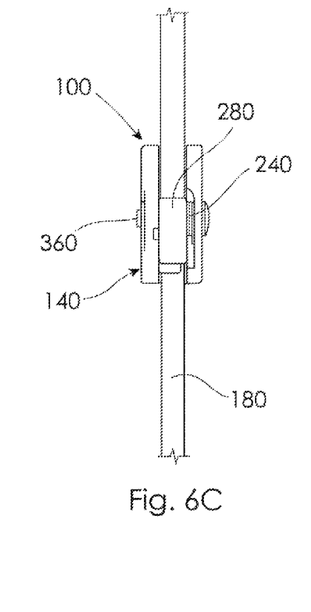
Figure 6D:
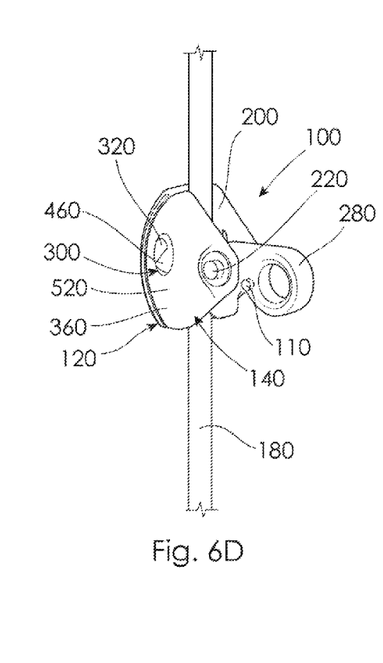
Figure 7A:
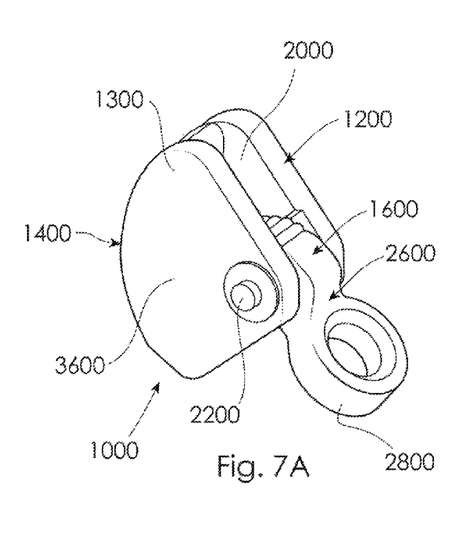
FIGS. 7A to 7G show various views of a rope grab of a further embodiment of the invention in both its open and closed positions.
Figure 7B:
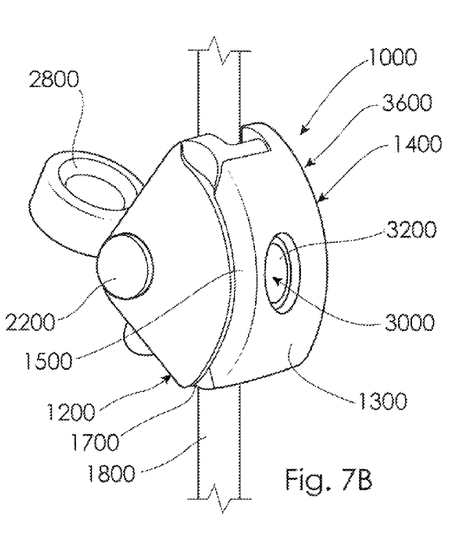
Figure 7C:
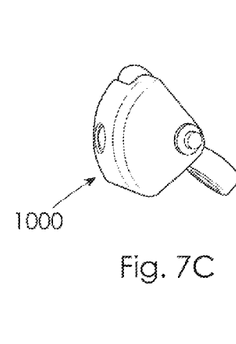
Figure 7D:
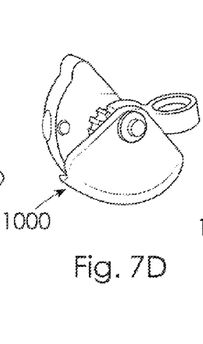
Figure 7E:
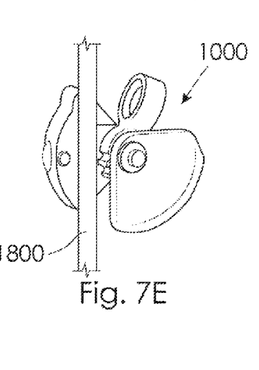
Figure 7F:
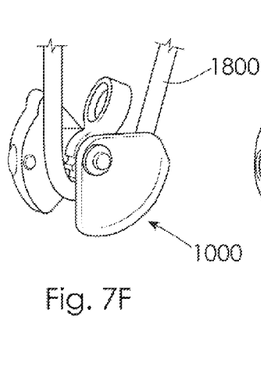
Figure 7G:
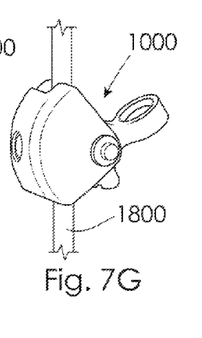

Should a fall occur, the coupling associated with the rope grab 10 pivots the lever 26 and the cam 16 to grab or engage the rope 18 to arrest the fall of a user or secure the load, see FIGS. 4A and 4B. More specifically, a downward force is exerted upon the lever 26 causing the lever 26 and the cam 16 to pivot about the pivot axle 22. As the lever 26 moves in a downward direction, the cam 16 moves in an upward direction, which causes the rope 18 to be sandwiched or engaged between the body 12 and the cam 16. This engagement is sufficient to prevent movement of the rope grab 10 along the length of the rope 18.

In this embodiment the rope grab 10 is designed wherein the torsion spring 24 functions also to urge the cover member 14 into the closed position. The lever 26 acts on the cover member 14 under the influence of the torsion spring 24. The catch 30 includes a ramp 46 on the retaining button 32. The cover member 14 slidably engages the ramp 46 for automatic depression of the retaining button 32 on swiveling of the cover member 14 to the closed position. The retaining button 32 is spring biased outwardly wherein the retaining button 32 and the complementary-shaped opening 34 engage to retain the cover member 14 in the closed position. Although not illustrated, the cover member 14 may include a chamfer shaped generally complementary to the ramp 46 on the button 32. The chamfer is designed, on swiveling of the cover member 14, to engage the ramp 46 to reduce the force required to fully close the cover member 14.

The cam 16 of this embodiment includes a series of adjacent teeth such as 48 designed to improve engagement with the rope 18. As best shown in FIGS. 4B and 4C the body 12 also includes a slight depression 50 in the recess 20 opposite the cam 16. The rope 18 is thus forced within the slight depression 50 when it is grabbed or engaged by the cam 16 to arrest the fall of a user or secure the load.

The rope grab 10 of this embodiment is designed so that the keyed engagement of the body 12 and the cover member 14 prevents lateral separation of these components. If the rope grab 10 twists or side forces are otherwise imposed on the cover member 14, the cover member 14 is interlocked with the body 12. This ensures the recess 20 remains enclosed and the rope 18 captured with the cover member 14 in the closed position. The cover member 14 includes a hollow 52 about a perimeter of the opening 34 to ensure the retaining button 32 is not inadvertently pressed and the cover member 14 opened to expose the recess 20 and release the rope 18 in the open position.

As shown in FIGS. 5A to 5D and 6A to 6D there is another embodiment of a rope grab 100. For ease of reference and to avoid repetition, components of this rope grab 100 which correspond with the previous embodiment have been referenced with an additional "0". For example, the body has been designated as 120. The rope grab 100 of this embodiment departs from the previous embodiment in the following respects:

1. the eye-shaped connection point 280 is arranged in the same general plane of the lever 260 and the body 120;
2. the rope grab 100 includes a protrusion in the form of a pip 110 mounted to the lever 260 and configured to abut the cover member 140 on its opening thereby disengaging the cam 160 from the rope 180.

Otherwise this rope grab 100 is essentially of the same construction as the previous embodiment.

FIGS. 7A to 7G illustrate a further embodiment of a rope grab 1000 with corresponding components designated with an additional "00". In this embodiment the cover plate 3600 includes a retaining member 1300 configured on movement toward the closed position to retain the body 1200. The retaining member 1300 includes a flange 1500 which wraps partially about the body 1200 to engage a rebate 1700 in the body 1200. This means that on closure of the cover member 3600, the cover member 3600 it interlocks with the body 1200 to prevent their lateral separation in a similar manner to the key 38 and the keyway 40 of the robe grab 10. The catch 3000 of this embodiment is relocated to the side of the body 1200.

Now that several preferred embodiments of the present invention have been described in some detail it will be apparent to those skilled in the art that the rope grab has at least the following advantages:
1. The rope grab can be connected to a rope anywhere along its length with relative ease;
2. The rope grab can be connected to a rope whilst retaining its connection with the associated coupling arrangement and user;
3. The rope grab lends itself to one-handed operation;
4. The rope grab is relatively minimal in its form and, for example, is less likely to snag associated equipment or rigging.

Those skilled in the art will appreciate that the invention described herein is susceptible to variations and modifications other than those specifically described. For example, the cover member need not be pivotally coupled to the body but rather may hinge or slidably move provided on opening it exposes the recess for receipt of the rope. The cam may be pivotally coupled to the cover member rather than the body provided it functions to grab or engage the rope within the recess. The connection point of the lever may include an integral swivel connector having a shackle. All such variations and modifications are to be considered within the scope of the present invention the nature of which is to be determined from the foregoing description.

The invention claimed is:

1. A rope grab comprising:
   a body including a recess adapted to receive a rope, the recess including a depression;
   a cover member coupled to the body for movement between an open position where the recess is exposed for receipt of the rope, and a closed position where the cover member encloses the recess to capture the rope;
   a cam pivotally coupled to one of the body and the cover member, said cam configured and arranged to engage the rope within the depression when the rope grab is moved along the rope in one direction whereas movement in an opposite direction along the rope is permitted without the cam engaging the rope;
   a spring operatively coupled to the cam to urge it into gripping engagement with the rope in the one direction whilst permitting movement of the rope grab in the opposite direction along the rope, the spring configured and arranged to urge the cover member into the closed position;
   a lever connected to the cam and coupled to a coupling for securement to a user, wherein movement of the cover member between the open and closed positions is effected whilst the coupling is connected to the lever.

2. The rope grab of claim 1, wherein the cover member is pivotally coupled to the body via a pivot axle.

3. The rope grab of claim 2, wherein the cam is also pivotally coupled to the body via the pivot axle.

4. The rope grab of claim 1, wherein the spring is a torsion spring mounted to the body via a pivot axle.

5. The rope grab of claim 1, wherein the cover member includes a cover plate which is generally flat and configured and arranged to pivot in a plane disposed substantially perpendicular to a pivot axle.

6. The rope grab of claim 5, wherein the cover plate includes a key configured and arranged for pivoting movement toward the closed position to engage with a keyway of the body to prevent lateral separation of the cover plate from the body.

7. The rope grab of claim 1, wherein the cam is formed integral with the lever.

8. The rope grab of claim 1, further comprising a depressible catch operatively coupled to the body to retain the cover member in the closed position.

9. The rope grab of claim 8, wherein the depressible catch is configured and arranged upon depression to release the cover member for movement toward the open position.

10. A rope grab comprising:
    a body including a recess adapted to receive a rope;
    a cover member coupled to the body for movement between an open position where the recess is exposed for receipt of the rope, and a closed position where the cover member encloses the recess to capture the rope;
    a cam pivotally coupled to one of the body and the cover member, said cam configured and arranged to engage the rope within the recess when the rope grab is moved along the rope in one direction whereas movement in an opposite direction along the rope is permitted without the cam engaging the rope;
    a lever connected to the cam and coupled to a coupling for securement to a user, wherein movement of the cover member between the open and closed positions is effected whilst the coupling is connected to the lever;
    a spring operatively coupled to the cam to urge it into gripping engagement with the rope in the one direction whilst permitting movement of the rope grab in the opposite direction along the rope, the spring urging the cover member into the closed position.

11. The rope grab of claim 10, wherein the cover member and the cam are pivotally coupled to the body via a pivot axle.

12. The rope grab of claim 10, wherein the spring is a torsion spring mounted to the body via a pivot axle.

13. The rope grab of claim 10, wherein the cam is formed integral with the lever.

14. The rope grab of claim 10, wherein the cover member includes a cover plate which is generally flat and configured and arranged to pivot in a plane disposed substantially perpendicular to a pivot axle.

15. The rope grab of claim 14, wherein the cover plate includes a key configured and arranged for pivoting movement toward the closed position to engage with a keyway of the body to prevent lateral separation of the cover plate from the body.

16. The rope grab of claim 10, further comprising a depressible catch operatively coupled to the body to retain the cover member in the closed position, the depressible catch configured and arranged upon depression to release the cover member for movement toward the open position.

* * * * *